US007006345B2

(12) United States Patent
Nakano et al.

(10) Patent No.: US 7,006,345 B2
(45) Date of Patent: Feb. 28, 2006

(54) MULTILAYER CERAMIC CAPACITOR AND ITS PRODUCTION METHOD

(75) Inventors: Yukie Nakano, Tokyo (JP); Mari Miyauchi, Tokyo (JP); Akira Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/030,194

(22) Filed: Jan. 7, 2005

(65) Prior Publication Data

US 2005/0152095 A1 Jul. 14, 2005

(30) Foreign Application Priority Data

Jan. 8, 2004 (JP) ............................ 2004-002647
Dec. 2, 2004 (JP) ............................ 2004-349374

(51) Int. Cl.
*H01G 4/06* (2006.01)
*H01G 4/005* (2006.01)
*C04B 35/46* (2006.01)

(52) U.S. Cl. ................. 361/321.5; 361/303; 29/25.42; 501/137

(58) Field of Classification Search ................ 361/303, 361/311, 320, 321.1, 321.3, 321.4, 321.5, 361/321.2; 501/137–139; 29/25.42
See application file for complete search history.

(56) References Cited

U.S. PATENT DOCUMENTS 4,218,723 A * 8/1980 Payne et al. ............. 361/321.4
2004/0176238 A1 * 9/2004 Ito et al. ..................... 501/136

FOREIGN PATENT DOCUMENTS

JP 10-189383 7/1998
JP 11-026285 1/1999
JP 2000-124058 4/2000

* cited by examiner

*Primary Examiner*—Eric W. Thomas

(74) *Attorney, Agent, or Firm*—Oblon, Spivak, McClelland, Maier & Neustadt, P.C.

(57) ABSTRACT

The invention aims to provide a multilayer ceramic capacitor with high dielectric constant, a high capacitance, and an excellent reliability by eliminating oxygen vacancy in dielectric layers and suppressing oxidation of Ni inner electrodes. The multilayer ceramic capacitor comprises a multilayered dielectric body composed by alternately piling up dielectric layers containing mainly barium titanate and inner electrode layers containing mainly Ni and a first hetero-phase containing Mg—Si—O as constituent elements exists in the capacitor.

18 Claims, 4 Drawing Sheets

Fig. 2A MgO=0.5mol

| | | | | |
|---|---|---|---|---|
| BCS (mol) | 3 | 28% | 35% | 40% |
| | 2 | 15% | 30% | 35% |
| | 1 | 10% | 28% | 32% |
| | | 1 | 2 | 3 |
| | | Y2O3(mol) | | |

Fig. 2B MgO=1.0mol

| | | | | |
|---|---|---|---|---|
| BCS (mol) | 3 | 15% | 18% | 20% |
| | 2 | 9% | 17% | 20% |
| | 1 | 8% | 14% | 15% |
| | | 1 | 2 | 3 |
| | | Y2O3(mol) | | |

Fig. 2C MgO=2.0mol

| | | | | |
|---|---|---|---|---|
| BCS (mol) | 3 | 5% | 7% | 15% |
| | 2 | 4% | 5% | 8% |
| | 1 | 3% | 5% | 6% |
| | | 1 | 2 | 3 |
| | | Y2O3(mol) | | |

MULTILAYER CERAMIC CAPACITOR AND ITS PRODUCTION METHOD

BACKGROUND OF THE INVENTION

1. Field of the Invention

The invention relates to a multilayer ceramic capacitor having Ni inner electrodes and its production method and particularly to production of hetero-phases in dielectric layers.

2. Description of the Related Art

A multilayer ceramic capacitor has been used widely as a compact, high power, and highly reliable electronic part and employed in a large number of electronic appliances. Along with the recent tendency of compactness and high power of the electronic appliances, it has been required more and more intensely also for the multilayer ceramic capacitor to be compact and have a high capacitance, a cost down, and an excellent reliability.

The multilayer ceramic capacitor comprises a layered dielectric body composed by alternately laminating dielectric layers and inner electrode layers and terminal electrodes formed on the main body of the layered dielectric element.

Since such a layered dielectric body is obtained by simultaneously firing an integrated body of the inner electrode layers and the dielectric layers, the material composing the inner electrode layers has to be not reactive on the dielectric layers even if it is fired simultaneously with the dielectric layers. Therefore, as the material for the inner electrode a noble metal such as platinum (Pt) or palladium (Pd) has been used. However, noble metals are expensive and with increase the number of the inner electrode with higher the capacitance, a problem of the cost was disclosed.

Accordingly, in recent years, a multilayer ceramic capacitor comprising Ni inner electrodes in which nickel, an economical base metal, is used for the inner electrodes has been used commonly.

In the case where nickel is used for the inner electrodes, it is required to fire the layered dielectric body in reducing atmosphere where nickel is not oxidized and therefore, as the dielectric material, a reduction resistant material which is not reduced even if fired in the reducing atmosphere has been used.

Even in the case where a reduction resistant dielectric material is used, if MLCC was fired in reducing atmosphere, some of oxygen in the dielectric material is disappeared and oxygen vacancy is caused. If the oxygen vacancy remains after production of a capacitor, there occurs a problem of inferior reliability. Accordingly, practically, annealing is carried out at a temperature lower than the firing temperature and in oxygen partial pressure higher than that in the firing atmosphere after the firing to eliminate the oxygen vacancy (reference, for example, Japanese Patent Application Laid-Open No. 2000-124058).

However, as described above, since Ni is easy to be oxidized, in the case where annealing is carried out, Ni tends to be easily oxidized. Although it depends on the oxygen partial pressure and the duration of the annealing, in the case where the dielectric layer is thinned and the number of dielectric layers increased, there occurs a problem that the most terminal part of the Ni inner electrodes is to be oxidized easily. If the terminal part of the Ni inner electrodes is oxidized and if the oxidation occurs to far extent, electric communication of the capacitor becomes impossible. If the oxidation is caused not so much, dispersion of capacitance sometimes becomes significant.

SUMMARY OF THE INVENTION

The findings from was carried out from the investigation of thin and multilayer structure of a dielectric layer for higher capacitance of a multilayer ceramic capacitor. The object of this invention is not only to eliminate the oxygen vacancy of a dielectric body but also to suppress oxidation of Ni inner electrodes, and it provide a multilayer ceramic capacitor having a high dielectric constant, a high capacitance, and excellent reliability.

Inventors have found that there is a close relation between the Ni oxidation and a hetero-phase which exist in a dielectric layer, a Ni inner electrode layer, or an interface of a Ni inner electrode layer and a dielectric layer. That is, existence of the hetero-phase in a multilayer ceramic capacitor suppresses oxidation of the Ni inner electrode layer.

According to the above-mentioned findings, a multilayer ceramic capacitor of the invention comprises a multilayered dielectric body obtained by alternately piling up dielectric layers of a dielectric material containing mainly barium titanate and inner electrode layers containing mainly Ni and is characterized in that a first hetero-phase containing Mg—Si—O as constituent elements exists. According to the invention, since the first hetero-phase containing Mg—Si—O as constituent elements exists, therefore the oxidation of the Ni inner electrode layers can be suppressed. The first hetero-phase is preferable to exist in interfaces of the dielectric layers and the inner electrode layers or in the inner electrode layers. Oxidation of the Ni inner electrode layers is further suppressed.

In the multilayer ceramic capacitor of the invention, it is more preferable that the first hetero-phase further contains one or more elements selected from Mn and Cr as constituent elements. If Mn or Cr exists in the first hetero-phase, the oxidation suppression effect on the inner electrode layers is heightened more.

In the multilayer ceramic capacitor of the invention, it is preferable that a second hetero-phase containing Re—Si—O (Re denotes one or more of Y, Dy, and Ho and the same below) as constituent elements does not exist or if it exists, the ratio of the second hetero-phase is lower than that of the first hetero-phase. The second hetero-phase may contain Ca as a constituent element. The oxidation of the Ni inner electrode layers can be suppressed by making the dielectric layers which are sandwiched between mutually neighboring inner electrode layers and effective as a capacitor free from the second hetero-phase containing Ca—Re—Si—O or making the existing amount of the second hetero-phase lower than that of the first hetero-phase if the second hetero-phase exists.

In the multilayer ceramic capacitor of the invention, the dielectric material is preferable to contain $SiO_2$ and MgO at the composition ratio of Si and Mg $(Si/Mg)<6$ as a first sub-component. Also, in the multilayer ceramic capacitor of the invention, the dielectric material is preferable to contain, as a second sub-component, rare earth oxide $Re_2O_3$ at the composition ratio of Re and Mg $(Re/Mg)\leqq 6$. In the case where the dielectric material contains $SiO_2$, MgO, and rare earth oxide $Re_2O_3$, which are the additive components, that is the first sub-component and the second sub-components, if $(Si/Mg)<6$ or $(Re/Mg)\leqq 6$ are satisfied, the first hetero-phase production in the dielectrics, the interfaces between the dielectric layers and inner electrode layers, or in the inner electrode layers is promoted and the second hetero-phase production in the dielectric layers can be suppressed.

In the multilayer ceramic capacitor of the invention, the MgO content in the dielectric material is preferably 2.5 mol or less in 100 mol of barium titanate. Decrease of the MgO content leads to increase of the dielectric constant at a room temperature and it is effective in increasing the capacitance.

In the multilayer ceramic capacitor of the invention, the dielectric material is preferable to contain, as a third sub-component, at least one of MnO and $Cr_2O_3$. Addition of these oxides is effective to improve the insulation resistance.

In the multilayer ceramic capacitor of the invention, the dielectric material is preferable to contain, as a fourth sub-component, at least one oxides selected from $V_2O_5$, $MoO_3$, and $WO_3$. Addition of very small amounts of these oxides is effective to improve the reliability.

In the multilayer ceramic capacitor of the invention, it is preferable that the thickness of the dielectric layers between the neighboring inner electrode layers is each 5 $\mu$m or thinner and the average grain diameter of the ceramic grains composing the dielectric layers is 0.05 $\mu$m or larger. It is also preferable that the number of the dielectric layers between the neighboring inner electrode layers is 100 or more. If the thickness of the dielectric layers between the neighboring inner electrode layers is 5 $\mu$m or thinner and the number of the dielectric layers is 100 or more, the effect to suppress the oxidation of the Ni inner electrode layers becomes significant.

A production method of the multilayer ceramic capacitor of the invention comprises a green laminated body formation step of obtaining a green laminated body to be the multilayered dielectric body by alternately piling up the dielectric layers containing mainly barium titanate and inner electrode layers containing mainly Ni; a firing step of forming the fired laminated body by firing the green laminated body in reducing atmosphere and precipitating the first hetero-phase containing Mg—Si—O as constituent elements in the dielectric layers; and an annealing step of annealing the fired laminated body at a temperature lower than that in the firing step and in an oxygen partial pressure higher than that in the firing step. In the annealing step, it is preferable to shift the first hetero-phase to the interfaces between the dielectric layers and the inner electrode layers or to the inner electrode layers. According to the invention, the first hetero-phase is formed during the firing of the multilayered dielectric body in the reducing atmosphere so that oxidation of the Ni inner electrode layers can be suppressed. Further, the first hetero-phase is shifted to the interfaces between the dielectric layers and the inner electrode layers or to the inner electrode layers so that the oxidation of the Ni inner electrode layers can be suppressed furthermore.

According to the invention, the oxidation of the Ni inner electrodes in the multilayer ceramic capacitor can be suppressed and accordingly, a multilayer ceramic capacitor having Ni inner electrodes with a large capacitance can be provided. In the case where the dielectric layers are made thin and more multilayered, the oxidation of the most terminal part of the Ni inner electrodes can be suppressed and thus dispersion of the capacitance can be narrowed and electric communication can be assured as well.

BRIEF DESCRIPTION OF THE DRAWINGS

FIG. 1 is a schematic view showing one embodiment of a basic structure of a multilayer ceramic capacitor of the invention and FIG. 1A is a schematic cross-sectional view.

FIG. 2A-2C are tables showing the results of the oxidation level in the terminal parts of samples of experiments 1 to 27.

DESCRIPTION OF THE PREFERRED EMBODIMENTS

Hereinafter, a multilayer ceramic capacitor of the invention will be described with reference to drawings. However, it is not intended that the invention be limited to the following embodiments to be illustrated.

(Multilayer Ceramic Capacitor)

Figure 1A:
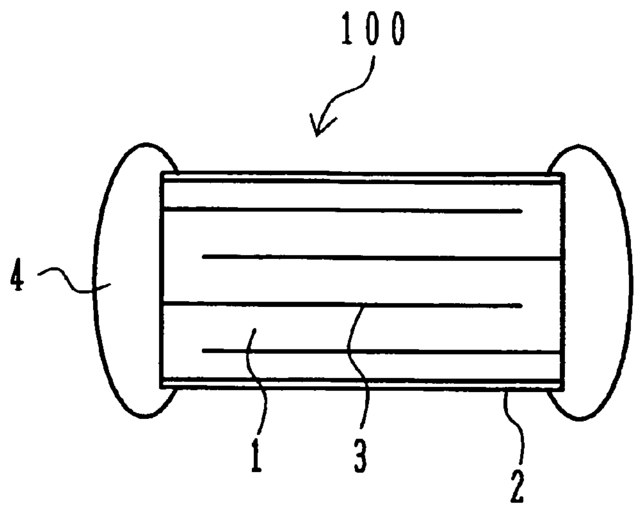

FIG. 1A is a schematic view showing one embodiment of a basic structure of a multilayer ceramic capacitor of the invention. As illustrated in FIG. 1A, the multilayer ceramic capacitor 100 of the invention comprises a multilayered dielectric body 2 formed by alternately piling up dielectric layers 1 and nickel inner electrode layers 3.

A pair of external electrodes 4 respectively electrically communicated to the inner electrode layers 3 arranged alternately in the inside of the multilayered dielectric body 2 are formed in both end parts of the multilayered dielectric body 2. The dielectric layers 1 contain mainly barium titanate and further contain sintering aid and other sub-components.

<Optimum Dielectric Composition>

A typical composition of the dielectric layers 1 can be exemplified as follows. That is, the composition contains as a main component, barium titanate; as sub-components, magnesium oxide and at least one oxide selected from yttrium oxide, dysprosium oxide, and holmium oxide; and further as other sub-components, at least one oxide selected from barium oxide, strontium oxide, and calcium oxide, at least one oxide selected from silicon oxide, manganese oxide, and chromium oxide, and at least one oxide selected from vanadium oxide, molybdenum oxide, and tungsten oxide. It is preferable to adjust the ratios of the respective oxides in 100 mol of $BaTiO_3$ as follows: MgO 0.1 to 2.5 mol or less; $Re_2O_3$ 6 mol or less; at least one of MO (M denotes at least one element selected from Mg, Ca, Sr and Ba), $Li_2O$, and $B_2O_3$ 6 mol or less; $SiO_2$ 6 mol or less (additionally, it is preferable to adjust MO ratio to be 1 mol to 1 mol of $SiO_2$); at least one of MnO and $Cr_2O_3$ 0.5 mol or less; and at least one of $V_2O_5$, $MoO_3$, and $WO_3$ 0.3 mol or less: in the case where the barium titanate is assumed to be $BaTiO_3$; magnesium oxide to be MgO; at least one oxide of yttrium oxide, dysprosium oxide, and holmium oxide to be $Re_2O_3$; barium oxide to be BaO; strontium to be SrO; calcium oxide to be CaO; silicon oxide to be $SiO_2$; manganese oxide to be MnO; chromium oxide to be $Cr_2O_3$; vanadium oxide to be $V_2O_5$; molybdenum oxide to be $MoO_3$; and tungsten oxide to be $WO_3$.

As the first sub-component to be added to the dielectric layers 1, it is preferable to add MgO and it is more preferable to add MgO at a ratio of 2.5 mol or less to 100 mol of barium titanate, a main component. It is preferable to add 0.1 mol or more of MgO since the addition satisfies the temperature range of the capacitance and on the other hand, if the addition amount of MgO exceeds the above-mentioned range, the dielectric constant is deteriorated and it results in difficulty of satisfying the requirements for the capacitor to be compact and have a high capacitance. With respect to a MgO addition method, MgO may be added, or alternatively, a compound containing Mg—Si—O may be added and MgO and a compound containing Mg—Si—O may be added.

As the first sub-component, $SiO_2$, which is a sintering aid component, is preferable to be added, and it is preferable to add $SiO_2$ 6 mol or less to 100 mol of barium titanate, a main component. Addition of $SiO_2$ is preferable to improve the sintering property and densify the barium titanate and on the other hand, if the content of $SiO_2$ exceeds the above-mentioned range, the second hetero-phase containing Re—Si—O tends to be formed easily. Therefore, the oxidation of the terminal part of the Ni inner electrode layers is accelerated. It is also preferable to contain at least one oxide selected from MO (M denotes at least one element selected from Mg, Ca, Sr, and Ba), $Li_2O$, and $B_2O_3$ together with $SiO_2$, which is a sintering aid component, in an amount of 6 mol or less to 100 mol of barium titanate, the main component. MO is further preferable to be added in an amount of 1 mol to 1 mol of $SiO_2$. The second hetero-phase includes the case as a constituent element, Ca is further contained and Ca—Re—Si—O may be included in the second hetero-phase.

To suppress oxidation level of the terminal part of the Ni inner electrode layers, the addition amount of MgO is better to be increased, however if the MgO addition amount is so high, e value of the dielectric material is decreased and it is desired to suppress the addition amount of MgO to low to satisfy the requirement of the compact size. So that, if the addition amount of MgO is suppressed to low, the oxidation level tends to be high. If $(Si/Mg)<6$ is satisfied, the oxidation level can be kept low. If $(Si/Mg)<0.5$, sintering becomes insufficient and therefore, it is preferable to keep $0.5 \leqq (Si/Mg)<6$.

As the second sub-component contained in the dielectric layers 1, it is preferable to add rare earth oxide $Re_2O_3$ is added at a ratio preferably 6 mol or less, more preferably 2 mol or less, to 100 mol of barium titanate, the main component. The addition of the rare earth oxide $Re_2O_3$ such as yttrium oxide is effective to improve the IR acceleration life and the DC bias property and therefore, it is preferable. On the other hand, if the addition amount of the rare earth oxide $Re_2O_3$ such as yttrium oxide exceeds the above-mentioned range, the second hetero-phase containing Re—Si—O is easily formed to lead to acceleration of the oxidation of the terminal part of the Ni inner electrode layers.

As it will be described in Examples, it is desirable to suppress the addition amount of MgO to satisfy the requirement of the compact size, however if the addition amount of MgO is suppressed, the oxidation level of the terminal part of the Ni inner electrode layers tends to be increased as described above. If $(Y/Mg) \leqq 6$ is satisfied, since the production of the second hetero-phase containing Re—Si—O is suppressed, the oxidation level of the terminal part of the Ni inner electrode layers can be suppressed low. If $(Y/Mg)<0.5$, the life of the dielectric layer material is short and therefore, it is desirable to keep $0.5 \leqq (Y/Mg) \leqq 6$.

Further the composition is adjusted so as to satisfy both $0.5 \leqq (Si/Mg)<6$ and $0.5 \leqq (Y/Mg) \leqq 6$, the e value of the dielectric material is increased and the requirement of compact size is satisfied and also the oxidation level of the terminal part of the Ni inner electrode layers is suppressed to low.

As a third component to be added to the dielectric layers 1, it is preferable to add at least one selected from MnO and $Cr_2O_3$ and it is more preferable to add at least one selected from MnO and $Cr_2O_3$ at a ratio of 0.5 mol or less to 100 mol of barium titanate, the main component. The addition of MnO or $Cr_2O_3$ provides resistance to reduction, dense structure of the dielectric layers, and IR accelerated life prolongation and therefore it is preferable, however if the content of MnO or $Cr_2O_3$ exceeds the above-mentioned range and is so high, the dielectric constant is decreased to fail to satisfy the requirements of the compact size and high capacitance.

As a fourth sub-component to be added to the dielectric layers 1, it is preferable to add at least one selected from $V_2O_5$, $MoO_3$, and $WO_3$ and it is more preferable to add at least one selected from $V_2O_5$, $MoO_3$, and $WO_3$ at a ratio of 0.3 mol or less to 100 mol of barium titanate, the main component. The addition of $V_2O_5$, $MoO_3$, and $WO_3$ is preferable to increase the high reliability, however on the other hand, if the content of $V_2O_5$, $MoO_3$, and $WO_3$ exceeds the above-mentioned range and is so high, it results in considerable decrease of IR in the initial period.

The dielectric layers 1 may further contain other compounds to the extent without departing from the spirit and scope of the invention.

<Inner Electrode Layer>

The inner electrode layers 3 are piled up in such a manner that the respect terminal surfaces of the layers are alternately exposed in the surfaces of two terminal parts in the opposed sides of the multilayered dielectric body 2. The outer electrodes 4, which will be described more below, are formed respectively in the terminal parts of the multilayered dielectric body 2 and connected to the exposed terminal faces of the alternately piled up nickel inner electrode layers 3 to compose the multilayer ceramic capacitor 100.

The conductive material composing the inner electrode layers 3 contains Ni as a main component. As the base metal to be used for the conductive material, nickel or a nickel alloy is preferable. The thickness of the inner electrode layers may be determined properly depending on the uses and it is generally 0.2 to 2.5 μm and preferably 0.4 to 1.5 μm.

The inner electrode layers 3 are formed by sintering a raw material powder of constituent materials. In the invention, as the raw material powder for composing the inner electrode layers 3, a powder of nickel or a nickel alloy with an average grain diameter of 0.5 μm or smaller, preferably 0.25 μm or smaller is used. The average grain diameter of the raw material powder is calculated by observation with a scanning electron microscope.

<Outer Electrode>

The outer electrodes 4 are electrodes respectively electrically communicated with nickel inner electrode layers 3 alternately arranged in the inside of the multilayered dielectric body 2 and a pair of the electrodes are formed in both end parts of the multilayered dielectric body 2. The conductive material contained in the outer electrodes 4 is not particularly limited and in the invention, economical Ni, Cu and their alloys may be used. The thickness of the outer electrodes may be determined properly based on the uses. The surfaces of the outer electrodes 4 are coated with coating layers by plating or the like.

<Fine Structure of Multilayered Dielectric Body>

The average grain diameter of the dielectric layers 1 is 0.6 μm or smaller, preferably 0.45 μm or smaller, and ever more preferably 0.25 μm or smaller. If the average grain diameter is 0.6 μm or smaller, the reliability is increased. The grain diameter is not particularly limited in the lower limit, however if the average grain diameter is made so small, the dielectric constant is decreased and therefore, the average grain diameter is preferable to be 0.05 μm or larger. The average grain diameter of the dielectric layers 1 is calculated by observation with a scanning electron microscope after the dielectric layer 1 are polished and the polished faces are chemically etched.

The thickness of each one layer of the dielectric layers 1 is not particularly limited, however according to the invention, the effects are significant if the thickness of the dielectric layers 1 is 5 μm or thinner. Also, if it is adjusted to be 2 μm or thinner, sufficient reliability can be obtained. The number of the dielectric layers to be piled up is generally 2 to 1,500.

Figure 1B:
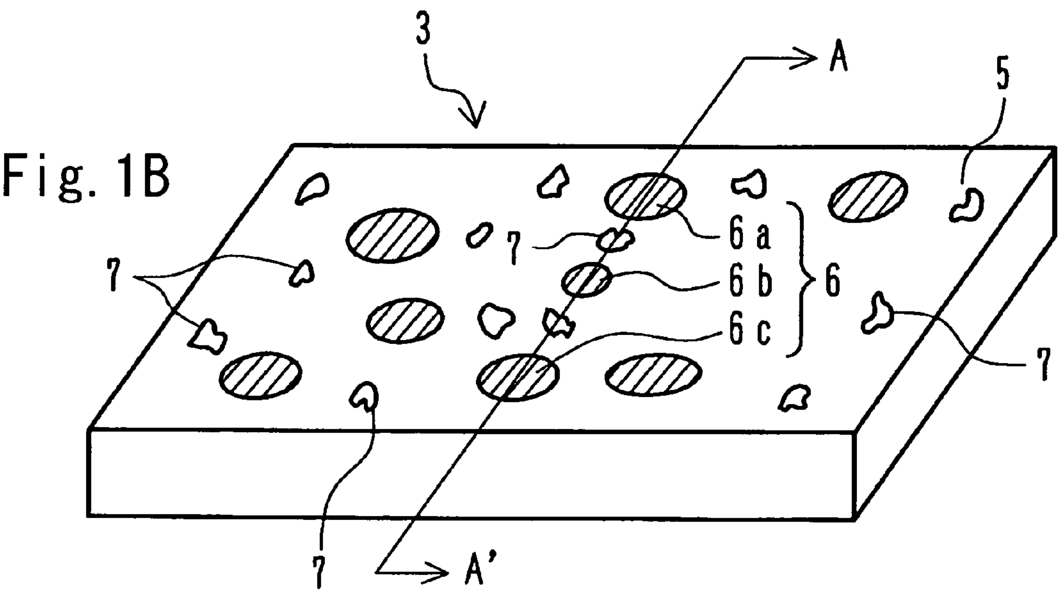
FIG. 1B is a schematic perspective view of the inner electrode layers.
Figure 1C:
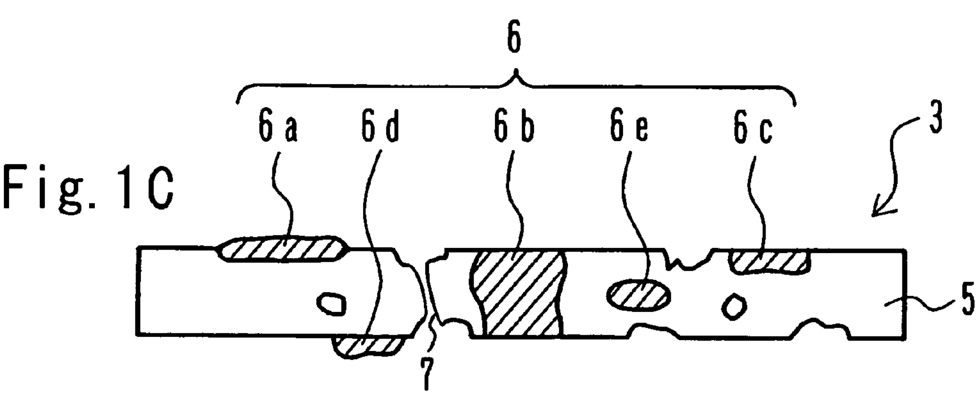
FIG. 1C is a schematic cross-sectional view along A–A' line of the inner electrode layers.

FIG. 1B shows a schematic perspective view of one embodiment of the inner electrode layers 3 of the multilayer ceramic capacitor 100. FIG. 1C shows a schematic cross-sectional view of the embodiment along the A–A' line of the inner electrode layers 3. In the multilayer ceramic capacitor 100, it is preferable that the first hetero-phase 6 containing Mg—Si—O as constituent elements exists in the interfaces of the dielectric layers 1 and the inner electrode layers 3 or in the inner electrode layers 3. As shown in FIG. 1B or FIG. 1C, the first hetero-phase 6 includes a first hetero-phase 6*a* precipitated in the interfaces of the dielectric layers 1 and the inner electrode layers 3; a first hetero-phase 6*c* existing in the interfaces of the dielectric layers 1 and the inner electrode layers 3 and precipitated in the inner electrode layer 3 side; a first hetero-phase 6*d* existing in the interfaces of the dielectric layers 1 and the inner electrode layers 3 and precipitated in the dielectric layers 1 side; a first hetero-phase 6*e* precipitated in the inner electrode layers 3; a first hetero-phase 6*b* penetrating the front and rear faces of the inner electrode layers 3; and their composite type phases. However, as shown in FIG. 1B, the inner electrode layers 3 are electrically communicated by the nickel phase 5 without being disconnected by the first hetero-phase 6. Owing to the existence of the first hetero-phase 6, the oxidation of the Ni inner electrode layers 3 is suppressed. The first hetero-phase 6 may exist in the dielectric layers 1 (not illustrated). The first hetero-phase 6 may further contain at least one of Mn and Cr as constituent elements and accordingly, the oxidation of the Ni inner electrode layers 3 can be suppressed more.

The dielectric layers 1 is preferable to be free from the second hetero-phase containing Re—Si—O as constituent elements or contain it less than the first hetero-phase if they contain the second hetero-phase. The measurement of the ratio of the second hetero-phase in the dielectric layers 1 is carried out based on the specific surface area of the second hetero-phase in the polished faces of the dielectric layers when the multilayer ceramic capacitor is polished from the side faces to the center part. The measurement of the ratio of the first hetero-phase in the dielectric layers 1 is carried out based on the specific surface area of the first hetero-phase in the polished faces of the dielectric layers when the multilayer ceramic capacitor is polished from the side faces to the center part. Suppression of the second hetero-phase in the dielectric layers 1, the oxidation of the Ni inner electrode layers 3 can be suppressed.

<Shape of Multilayered Dielectric Body>

The shape of the multilayered dielectric body 2 is generally rectangular, however it is not particularly limited. The size of the main body is also not particularly limited, however it is about 0.4 to 5.6 mm longer side×0.2 to 5.0 mm shorter side×0.2 to 1.9 mm height.

(Production Method of Multilayered Dielectric Body)

In a production method of the multilayered dielectric body 2, the production steps to be carried out will be described. Details of the respective steps will be described in Examples. At first, there is a green laminated body formation step. The dielectric layers containing mainly barium titanate and inner electrode layers containing mainly Ni are alternately layered to obtain the green laminated body to be the multilayered dielectric body.

Next, there is a firing step. The green laminated body is fired at firing temperature 1,150 to 1, 400° C. and in reducing atmosphere in which an oxygen partial pressure is lower than $1.0\times10^{-2}$ Pa, preferably $1.0\times10^{-7}$ to $1.0\times10^{-4}$ Pa to obtain a fired laminated body.

Next, there is an annealing step of annealing the fired laminated body at a temperature lower than that in the firing step and in an oxygen partial pressure higher than that in the firing step. The annealing is preferable to be carried out at a temperature, for example 900 to 1,200° C., lower than the firing temperature and in a higher oxygen partial pressure, for example $1.0\times10^{-2}$ to $1.0\times10$ Pa, than that of the firing atmosphere. In addition, before the firing step, a binder removal step may be added properly. The multilayered dielectric body obtained in such a manner is subjected to the end face polishing by barrel polishing or sand blast and a paste for the outer electrodes is applied and fired to form the outer electrodes 4. The firing of the paste for the outer electrodes is preferably controlled at 600 to 800° C. for 10 minutes to 1 hour in reducing atmosphere. Based on the necessity, coating layers may be formed on the surfaces of the outer electrodes 4 by plating.

EXAMPLES

Hereinafter, the invention will be described more in details with reference of practical Examples of the invention.

(Experiment 1)

A paste for the dielectric layers, a paste for the inner electrode layers, and a paste for the outer electrodes were prepared at first.

The paste for the dielectric layers was prepared as follows. $(MgCO_3)_4.Mg(OH)_2.5H_2O$, $MnCO_3$, $BaCO_3$, $CaCO_3$, $SiO_2$, $Y_2O_3$, and $V_2O_5$ were added to $Ba_{1.005}TiO_3$ produced by hydrothermal synthesis method and wet-mixed for 16 hours by a ball mill to obtain a dielectric raw material with a final composition containing $Ba_{1.005}TiO_3$ and MgO 0.5 mol %, MnO 0.4 mol %, $Y_2O_3$1.0 mol %, $(Ba_{0.6}, Ca_{0.4})SiO_3$ (hereinafter, abbreviated as BCS) 1.0 mol %, and $V_2O_5$ 0.05 mol %. The final composition is shown in Table 1. Next, a resin 6 part by weight, a dilution solvent 55 part by weight, a plasticizer, an antistatic agent and the like were added to the dielectric raw material 100 part by weight to make the mixture a paste and obtain a paste for dielectric layers.

TABLE 1

| | | MgO | MnO | $Y_2O_3$ | $(Ba_{0.6}, Ca_{0.4})SiO_3$ | $V_2O_5$ |
|---|---|---|---|---|---|---|
| Experiment 1 | Example | 0.5 | 0.4 | 1.0 | 1.0 | 0.05 |
| Experiment 2 | Comparative Example | 0.5 | 0.4 | 2.0 | 1.0 | 0.05 |
| Experiment 3 | Comparative Example | 0.5 | 0.4 | 3.0 | 1.0 | 0.05 |
| Experiment 4 | Example | 0.5 | 0.4 | 1.0 | 2.0 | 0.05 |
| Experiment 5 | Comparative Example | 0.5 | 0.4 | 2.0 | 2.0 | 0.05 |
| Experiment 6 | Comparative Example | 0.5 | 0.4 | 3.0 | 2.0 | 0.05 |

TABLE 1-continued

| | | MgO | MnO | $Y_2O_3$ | $(Ba_{0.6}, Ca_{0.4})SiO_3$ | $V_2O_5$ |
|---|---|---|---|---|---|---|
| Experiment 7 | Comparative Example | 0.5 | 0.4 | 1.0 | 3.0 | 0.05 |
| Experiment 8 | Comparative Example | 0.5 | 0.4 | 2.0 | 3.0 | 0.05 |
| Experiment 9 | Comparative Example | 0.5 | 0.4 | 3.0 | 3.0 | 0.05 |
| Experiment 10 | Example | 1.0 | 0.4 | 1.0 | 1.0 | 0.05 |
| Experiment 11 | Example | 1.0 | 0.4 | 2.0 | 1.0 | 0.05 |
| Experiment 12 | Example | 1.0 | 0.4 | 3.0 | 1.0 | 0.05 |
| Experiment 13 | Example | 1.0 | 0.4 | 1.0 | 2.0 | 0.05 |
| Experiment 14 | Example | 1.0 | 0.4 | 2.0 | 2.0 | 0.05 |
| Experiment 15 | Example | 1.0 | 0.4 | 3.0 | 2.0 | 0.05 |
| Experiment 16 | Example | 1.0 | 0.4 | 1.0 | 3.0 | 0.05 |
| Experiment 17 | Example | 1.0 | 0.4 | 2.0 | 3.0 | 0.05 |
| Experiment 18 | Example | 1.0 | 0.4 | 3.0 | 3.0 | 0.05 |
| Experiment 19 | Example | 2.0 | 0.4 | 1.0 | 1.0 | 0.05 |
| Experiment 20 | Example | 2.0 | 0.4 | 2.0 | 1.0 | 0.05 |
| Experiment 21 | Example | 2.0 | 0.4 | 3.0 | 1.0 | 0.05 |
| Experiment 22 | Example | 2.0 | 0.4 | 1.0 | 2.0 | 0.05 |
| Experiment 23 | Example | 2.0 | 0.4 | 2.0 | 2.0 | 0.05 |
| Experiment 24 | Example | 2.0 | 0.4 | 3.0 | 2.0 | 0.05 |
| Experiment 25 | Example | 2.0 | 0.4 | 1.0 | 3.0 | 0.05 |
| Experiment 26 | Example | 2.0 | 0.4 | 2.0 | 3.0 | 0.05 |
| Experiment 27 | Example | 2.0 | 0.4 | 3.0 | 3.0 | 0.05 |
| Experiment 28 | Comparative Example | 1.0 | 0.4 | 4.0 | 2.0 | 0.05 |

The paste for the inner electrode layers was prepared as follows. Ethyl cellulose resin 5 part by weight and terpineol 35 part by weight were added to Ni raw material powder with 0.4 μm size 100 part by weight and kneaded by three rolls to obtain a paste.

The paste for the outer electrodes was prepared as follows. Cu rains 72 part by weight, glass 5 part by weight, and an organic vehicle (ethyl cellulose resin 8 part by weight and butyl carbitol 92 part by weight) 23 part by weight were kneaded by three rolls to obtain a paste.

Next, using the paste for the dielectric layers and the paste for the inner electrode layers obtained in the above-mentioned manner, multilayer ceramic capacitors with the structure shown in FIG. 1 were produced. At first, green sheets with a thickness of 5 μm were formed on PET (polyethylene terephthalate resin) film by using the paste for dielectric layers; the paste for the inner electrode layers was printed on the green sheets and then the sheets were peeled out of the PET film. A plurality of the sheets produced in such a manner were laminated. Sheets only containing the dielectric material without the paste printing for electrodes were laminated on the top and the bottom to form 200 μm protection layers. The laminated layers were pressure-bonded to obtain a green laminated body. Next, the green laminated bodies were cut into a predetermined size to obtain green chips which were subjected to binder removal treatment, firing, and annealing in the conditions shown in Table 2 to obtain multilayered dielectric device main bodies. Water was used for humidifying the ambient gas in the respective conditions shown in Table 2. The firing temperature was adjusted to be the optimum depending on the compositions of respective samples.

The firing temperature and the oxygen partial pressure in the firing conditions in Table 2 differed since the sintering aids differed depending on the samples and they were adjusted in the ranges shown in Table 2 and the results were compared with those obtained at the optimum firing temperature.

TABLE 2

| binder removal treatment conditions | firing conditions | annealing conditions |
|---|---|---|
| heating rate: 15° C./h<br>holding temperature: 280° C.<br>temperature holding time: 8 hs<br>ambient gas: air | heating rate: 200° C./h<br>holding temperature: 1,150 to 1,350° C.<br>temperature holding time: 2 hs<br>cooling ratio: 200° C./h<br>ambient gas: humidified gas mixture of N2 and H2<br>oxygen partial pressure: $1.0 \times 10^{-7}$ to $1.0 \times 10^{-4}$ Pa ($10^{-12}$ to $10^{-9}$ atmospheric pressure) | holding temperature: 1,100° C.<br>temperature holding time: 3 hs<br>ambient gas: humidified $N_2$ gas<br>oxygen particle pressure: 0.4 Pa ($4 \times 10^{-6}$ atmospheric pressure) |

The size of the respective samples produced in such a manner was 3.2 mm×1.6 mm×0.6 mm: the thickness of the dielectric layers was 3 μm: and the thickness of the inner electrode layers was 1.5 μm. The average grain diameter of the dielectric layers of the respective samples was 0.35 μm. The average grain diameter was calculated by using images of cross-sectional views of the samples taken by a scanning electron microscope.

(Experiment 2)

Samples of multilayer ceramic capacitors with the same shape as those of the Experiment 1 were obtained in the same manner as Experiment 1, except that a dielectric raw material of the pastes for the dielectric layers with a final composition was adjusted as $Ba_{1.005}TiO_3$ and MgO 0.5 mol %, MnO 0.4 mol %, $Y_2O_3$ 2.0 mol %, BCS 1.0 mol %, and $V_{2050.05}$ mol %. The final composition of the dielectric raw material is shown in Table 1. The thickness of the dielectric layers and the thickness of the inner electrode layers were almost same as those in Experiment 1.

(Experiments 3 to 28)

Samples of the multilayer ceramic capacitors with the same shape were obtained in the same manner as Experiment 1, except the final compositions of the dielectric raw materials of the pastes for the dielectric layers were adjusted as the Experiments 3 to 28 in Table 1. The final compositions of the dielectric raw materials are shown in Table 1. The thickness of the dielectric layers and the thickness of the inner electrode layers were almost same as those in Experiment 1.

Figure 3:
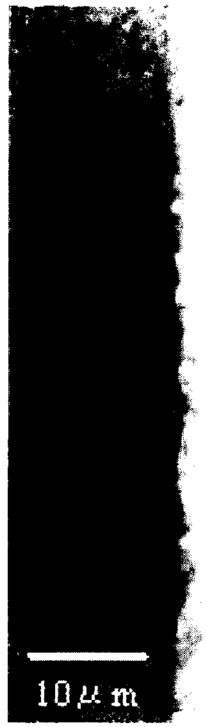
FIG. 3 is a microscopic image of oxidized terminal parts.
Figure 4:
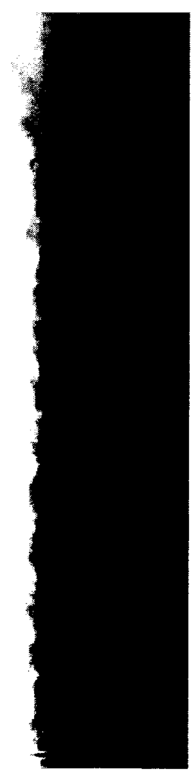
FIG. 4 is a microscopic image of terminal parts whose oxidation is suppressed.

The oxidation level of the terminal part of the Ni inner electrode layers were obtained for Experiments 1 to 27. The oxidation level were judged by observing the polished faces of the multilayer ceramic capacitors polished from the side faces to the center parts. The faces were photographed with 1,000 magnification by an optical microscope and the ratio (%) of oxidized parts in the inner electrode layers in the range of 2 cm (equivalent to 20 μm of the respective chips) from the end parts in the photographs was calculated. The oxidation ratio means the ratio of the first hetero-phase 6, which is separated from the not-oxidized nickel phase 5, in the inner electrode layers 3, for example in FIG. 1C. More practically, occurrence of the oxidation was judged based on the fact that the metal is observed to be white and oxides are observed to be gray in the microscopic photograph. For each sample, 10 view fields each of which includes 10 electrodes were observed and the average value was employed. The results are shown in FIG. 2. The image examples of microscopic photographs of the oxidized terminal parts are shown in FIG. 3. The image examples of microscopic photographs of the terminal parts in which oxidization is suppressed are shown in FIG. 4. The Ni inner electrodes are shown as a plurality of the parallel lines in FIG. 3 and FIG. 4 and the white portions are of metal phase which is not oxidized and the portions gray similarly to the dielectric layers are nickel oxide phase.

FIG. 2A shows the oxidation levels of the terminal part of the Ni inner electrode layers of Experiments 1 to 9: FIG. 2B shows the oxidation levels of the terminal part of the Ni inner electrode layers of Experiments 10 to 18: and FIG. 2C shows the the oxidation levels of the terminal part of the Ni inner electrode layers of Experiments 19 to 27, respectively. To suppress the oxidation level to 20% or less, it is better to increase the MgO addition amount (2.0 mol), however if the addition amount of MgO is high, the e value of the dielectric materials is decreased and therefore, it is desired to suppress MgO addition to satisfy the requirement of compact size. Accordingly, if the addition amount of MgO is suppressed to 0.5 mol or 1.0 mol, the oxidation level is found increased. Under such a condition, if $(Si/Mg)<6$ and $(Y/Mg)\leqq 6$ are satisfied, the oxidation level is suppressed to 20% or lower. Additionally, Si 1 mol is added to BCS 1 mol. In the case where investigations were carried out for the compositions other than those shown in Table 1 and satisfying $(Si/Mg)<0.5$ or $(Y/Mg)\leqq 0.5$, sintering was found insufficient if $(Si/Mg)<0.5$. In the case of $(Y/Mg)=0.5$, the life of the dielectric material was in an allowable range, however in the case of $(Y/Mg)<0.5$, the dielectric material was found having a shorter life than those of Examples. Accordingly, the compositions are desirable to satisfy preferably at least one, more preferably both of $0.5\leqq(Si/Mg)<6$ and $0.5\leqq(Y/Mg)\leqq 6$. In Examples, MgO content was decreased to increase the e value of the dielectric materials, and $Y_2O_3$ addition amount was decreased to suppress the oxidation level. Consequently, the reliability of the multilayer ceramic capacitors is decreased, and therefore, BCS, that is the addition amount of Si, is also decreased together with decrease of the $Y_2O_3$ addition amount. Accordingly, it is supposed that since the Y component to form the second hetero-phase is decreased, deterioration of the reliability of the multilayer ceramic capacitors can be suppressed.

(Distribution of Addition Components of Experiments 13 to 15 and Experiment 28)

To investigate the distribution of addition components in cross-sections of multilayer ceramic capacitors, the samples of Experiments 13 to 15 and Experiment 28 were evaluated. The final compositions of the dielectric layer and the oxidation levels of the terminal part of the Ni inner electrode layers of the respective samples are shown in Table 3. The oxidation level of Experiment 28 was measured in the same manner as Experiments 13 to 15.

TABLE 3

| | | MgO | MnO | $Y_2O_3$ | $(Ba_{0.6}, Ca_{0.4})SiO_3$ | $V_2O_5$ | oxidation level of terminal part of Ni inner electrode |
|---|---|---|---|---|---|---|---|
| Experiment 13 | Example | 1.0 | 0.4 | 1.0 | 2.0 | 0.05 | 9 |
| Experiment 14 | Example | 1.0 | 0.4 | 2.0 | 2.0 | 0.05 | 17 |
| Experiment 15 | Example | 1.0 | 0.4 | 3.0 | 2.0 | 0.05 | 20 |

TABLE 3-continued

| | | MgO | MnO | $Y_2O_3$ | $(Ba_{0.6}, Ca_{0.4})SiO_3$ | $V_2O_5$ | oxidation level of terminal part of Ni inner electrode |
|---|---|---|---|---|---|---|---|
| Experiment 28 | Comparative Example | 1.0 | 0.4 | 4.0 | 2.0 | 0.05 | 35 |

Figure 5:
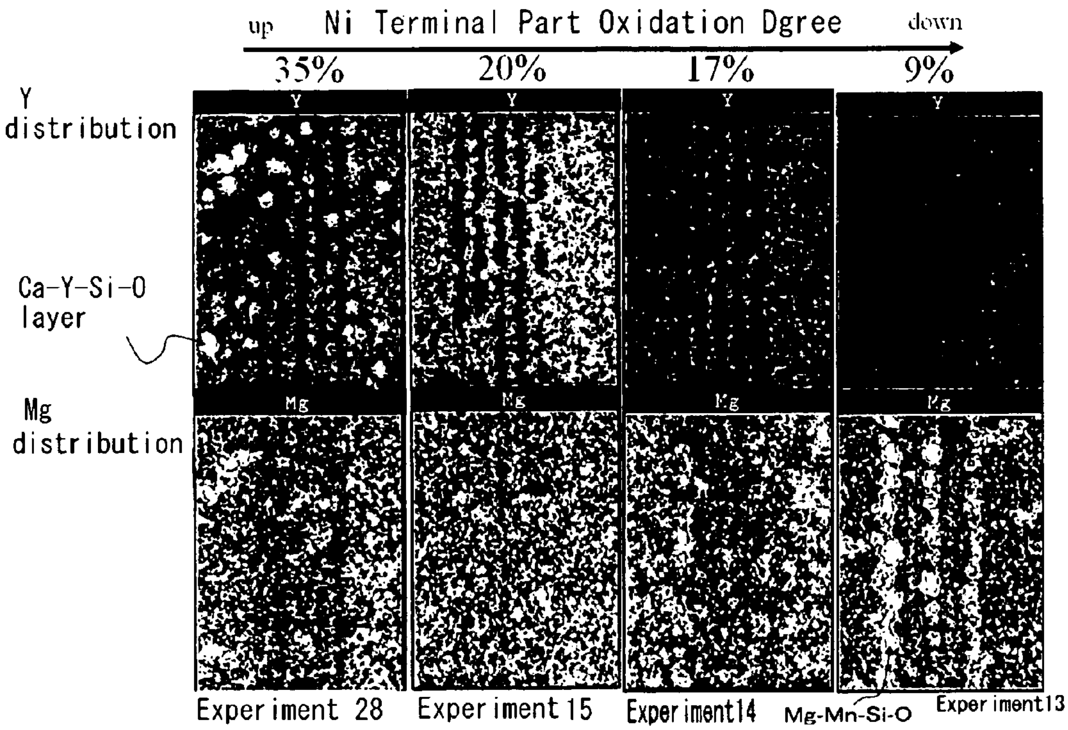
FIG. 5 is images showing the results of EPMA analysis of cross section of the experiments 13 to 15 and the experiment 28.

With respect to Experiments 13 to 15 and Experiments 28, the results of the EPMA analysis of the polished faces are shown in FIG. 5. In FIG. 5, the inner electrode layers are shown as a plurality of the vertical parallel lines. The EPMA analysis was carried out by using JCMA 733 manufactured by Nippon Denshi Datum. As shown by the samples of Experiments 13 to 15 in FIG. 5, if $Y_2O_3$ was in a small amount, the first hetero-phase containing Mg—Si—O as constituent elements existed and the second hetero-phase containing Y—Si—O did not exist in the dielectric layers. It is found that the oxidation of the terminal parts of the Ni inner electrode layers was suppressed if the first hetero-phase containing Mg—Si—O as constituent elements existed. Also, it is found that the oxidation of the terminal parts of the Ni inner electrode layers was suppressed if the second hetero-phase containing Y—Si—O did not exist or existed in a smaller amount than that of the first hetero-phase. In this case, it is also found that Mn was distributed at same points as Mg and that Mn existed also in the first hetero-phase.

On the other hand, as shown by the samples of Experiment 28 in FIG. 5, if $Y_2O_3$ was in a large amount, no first hetero-phase containing Mg—Si—O as constituent elements existed and the second hetero-phase containing Y—Si—O existed in the dielectric layers. It is found that the oxidation of the terminal parts of the Ni inner electrode layers was not suppressed since no first hetero-phase containing Mg—Si—O as constituent elements existed and the second hetero-phase containing Y—Si—O existed in the dielectric layers. It is also found that Mn was distributed closely to Mg and that Mn existed also in the second hetero-phase.

It is found that if $Y_2O_3$ existed in a large amount, Si was distributed closely to Y and if $Y_2O_3$ existed in a small amount, Si was distributed closely to Mg and Y was distributed in the inside of the grains of barium titanate.

From the above-mentioned findings, oxidation of the Ni inner electrode layers was suppressed by precipitating the first hetero-phase containing Mg—Si—O as constituent elements in the interfaces of the dielectric layers and the inner electrode layers or in the inner electrode layers. Also, oxidation of the Ni inner electrode layers was further suppressed by existence of the first hetero-phase in the interfaces of the dielectric layers and the inner electrode layers or in the inner electrode layers. Also, oxidation of the Ni inner electrode layers was suppressed by decreasing the ratio of the second hetero-phase in the dielectric layers.

(Experiments 29 to 32)

On one hand, Y (yttrium) was added as Re in Experiments 1 to 28, in these Examples, Dy or Ho was added in place of Y or two or more elements selected from Y, Dy, and Ho were added and also in these cases, the same tendency was observed and oxidation of the terminal parts of the Ni inner electrode layers was suppressed by precipitation of the first hetero-phase. That is, since Y, Dy, and Ho are rare earth elements and have similar ionic diameter, replacement of the sites of Y with Dy and Ho is possible.

For example, in Experiments 29 and 30 with the same composition as shown in Table 4, if $Dy_2O_3$ or $Ho_2O_3$ was in a small amount, the first hetero-phase containing Mg—Si—O as constituent elements existed. In Experiment 29, no second hetero-phase containing Dy—Si—O existed in the dielectric layers. In Experiment 30, no second hetero-phase containing Ho—Si—O existed in the dielectric layers. It is found that the oxidation of the terminal parts of the Ni inner electrode layers was suppressed if the first hetero-phase existed. Also, it is found that the oxidation of the terminal parts of the Ni inner electrode layers was suppressed if the second hetero-phase containing Dy—Si—O or Ho—Si—O did not exist or existed in a smaller amount than that of the first hetero-phase even in the case where the second hetero-phase existed. In this case, it is also found that Mn was distributed closely to Mg and that Mn existed also in the first hetero-phase.

TABLE 4

| | | MgO | MnO | $Re_2O_3$ | $(Ba_{0.6}, Ca_{0.4})SiO_3$ | $V_2O_5$ | oxidation level of terminal part of Ni inner electrode |
|---|---|---|---|---|---|---|---|
| Experiment 29 | Example | 1.0 | 0.4 | $Dy_2O_3$ 1.0 | 2.0 | 0.05 | 11 |
| Experiment 30 | Example | 1.0 | 0.4 | $Ho_2O_3$ 1.0 | 2.0 | 0.05 | 8 |
| Experiment 31 | Comparative Example | 1.0 | 0.4 | $Dy_2O_3$ 4.0 | 2.0 | 0.05 | 38 |
| Experiment 32 | Comparative Example | 1.0 | 0.4 | $Ho_2O_3$ 4.0 | 2.0 | 0.05 | 32 |

On the other hand, in Experiments 31 and 32 with the compositions as shown in Table 4, if $Dy_2O_3$ or $Ho_2O_3$ was in a large amount, no first hetero-phase containing Mg—Si—O as constituent elements existed. In Experiment 31, the second hetero-phase containing Dy—Si—O existed in the dielectric layers. In Experiment 32, the second hetero-phase containing Ho—Si—O existed in the dielectric layers. It is found that the oxidation of the terminal parts of the Ni inner electrode layers was not suppressed since no first hetero-phase existed in the Ni inner electrode layers and in the interfaces between the Ni inner electrode layers and the dielectric layers and the second hetero-phase containing Dy—Si—O or Ho—Si—O existed in the dielectric layers. In this case, it is also found that Mn was distributed closely to Mg and that Mn existed also in the second hetero-phase.

If $Dy_2O_3$ or $Ho_2O_3$ was in a large amount, Si was distributed closely to Dy or Ho. It is found that if $Y_2O_3$ was in a small amount, Si was distributed closely to Mg and Dy or Ho was distributed in the inside of the grains of barium titanate.

From the above-mentioned findings, even if Re is Dy or Ho, oxidation of the Ni inner electrode layers can be suppressed by precipitation of the first hetero-phase similarly to the case of using Y and oxidation of the Ni inner electrode layers can be suppressed by decreasing the ratio of the second hetero-phase in the dielectric layers.

In Tables 1, 3, and 4 showing the compositions of Experiments 1 to 32, in the case where $Cr_2O_3$ is added in place of MnO or $Cr_2O_3$ is added with MnO, or in the case where $MoO_3$ or $WO_3$ is added in place of $V_2O_5$ or at least two oxides selected from $V_2O_5$, $MoO_3$ and $WO_3$ are added, the effects on the hetero-phases and the oxidation of the terminal part of the Ni inner electrode layers were obtained similarly to the results of Experiments 1 to 32.

Using the multilayer ceramic capacitors produced in Experiment 4, the effects of the annealing conditions on the oxidation of the terminal part of the Ni inner electrode layers were investigated. The results are shown in Table 5. Table 5 shows the correlation between the annealing conditions and the oxidation level of terminal part (%). It was confirmed that the oxidation of the terminal part was accelerated by prolonging the annealing duration or increasing the temperature. Accordingly, the oxidation of the terminal part can be suppressed by precipitating the first hetero-phase and moderating the annealing conditions.

TABLE 5

| annealing conditions | oxidation level of the terminal part of Ni inner electrode layer (%) |
|---|---|
| 1100° C./1 hour | 6 |
| 1100° C./2 hours | 9 |
| 1100° C./3 hours | 15 |
| 1000° C./3 hours | 12 |
| 900° C./3 hours | 8 |

What is claimed is:

1. A multilayer ceramic capacitor comprising a multilayered dielectric body composed by alternately piling up a dielectric layer comprising a dielectric containing mainly barium titanate and an inner electrode layer containing mainly Ni, wherein a first hetero-phase containing Mg—Si—O as constituent elements exists.

2. The multilayer ceramic capacitor according to claim 1, wherein the first hetero-phase exists in interfaces between the dielectric layers and the inner electrode layers or in the inner electrode layers.

3. The multilayer ceramic capacitor according to claim 2, wherein the first hetero-phase further contains at least one element selected from Mn and Cr.

4. The multilayer ceramic capacitor according to claim 3, wherein the second hetero-phase further contains Ca as a constituent element.

5. The multilayer ceramic capacitor according to claim 1, wherein the first hetero-phase further contains at least one element selected from Mn and Cr.

6. The multilayer ceramic capacitor according to claim 1, wherein a second hetero-phase containing Re—Si—O (wherein Re denotes one or more elements selected from Y, Dy, and Ho) does not exist in the dielectric layers or exists in a ratio smaller than that of the first hetero-phase if existing.

7. The multilayer ceramic capacitor according to claim 6, wherein the dielectrics contain $SiO_2$ and MgO as first sub-components and the composition ratio of Si and Mg is (Si/Mg)<6.

8. The multilayer ceramic capacitor according to claim 6, wherein the thickness of each dielectric layer between neighboring inner electrode layers is 5 μm or thinner and the average grain diameter of the ceramic grains composing the dielectric layers is 0.05 μm or larger.

9. The multilayer ceramic capacitor according to claim 6, wherein the number of the dielectric layers layered between the inner electrode layers is 100 or more.

10. The multilayer ceramic capacitor according to claim 1, wherein the dielectrics contain $SiO_2$ and MgO as first sub-components and the composition ratio of Si and Mg is (Si/Mg)<6.

11. The multilayer ceramic capacitor according to claim 10, wherein the dielectrics contain a rare earth oxide $Re_2O_3$ as a second sub-component at the composition ratio of Re and Mg (Re/Mg)≦6.

12. The multilayer ceramic capacitor according to claim 10, wherein the content of MgO in the dielectrics is 2.5 mol or less to 100 mol of barium titanate.

13. The multilayer ceramic capacitor according to claim 12, wherein the dielectrics contain at least one selected from MnO and $Cr_2O_3$ as a third sub-component.

14. The multilayer ceramic capacitor according to claim 13, wherein the dielectrics contain at least one selected from $V_2O_5$, $MoO_3$, and $WO_3$ as a fourth sub-component.

15. The multilayer ceramic capacitor according to claim 1, wherein the content of MgO in the dielectrics is 2.5 mol or less to 100 mol of barium titanate.

16. The multilayer ceramic capacitor according to claim 1, wherein the thickness of each dielectric layer between neighboring inner electrode layers is 5 μm or thinner and the average grain diameter of the ceramic grains composing the dielectric layers is 0.05 μm or larger.

17. A production method of a multilayer ceramic capacitor comprising:

a green laminated body formation step of obtaining a green laminated body to be the multilayered dielectric body by alternately piling up the dielectric layers of dielectrics containing mainly barium titanate and inner electrode layers containing mainly Ni, a firing step of forming the fired laminated body by firing the green laminated body in reducing atmosphere and precipitating the first hetero-phase containing Mg—Si—O as constituent elements in the dielectric layers, and an annealing step of annealing the fired laminated body at a temperature lower than that in the firing step and in an oxygen partial pressure higher than that in the firing step.

18. The production method of a multilayer ceramic capacitor according to claim 17, wherein in the annealing step, the first hetero-phase is shifted to the interfaces between the dielectric layers and the inner electrode layers or to the inner electrode layers.

* * * * *